United States Patent
Renz et al.

(10) Patent No.: US 6,355,306 B1
(45) Date of Patent: Mar. 12, 2002

(54) PROCESS FOR USING NON-VOLATILE COMPONENTS UNDER PROCESSING CONDITIONS FOR BASECOAT COMPOSITIONS CONTAINING PREDOMINANTLY ORGANIC SOLVENTS

(75) Inventors: Rudolf Renz, Rottendorf; Bodo Muller, Wurzburg; Willy Vesper, Wiesentheid, all of (DE)

(73) Assignee: Basf Lacke & Farben Aktiengesellschaft, Munster (DE)

( * ) Notice: Subject to any disclaimer, the term of this patent is extended or adjusted under 35 U.S.C. 154(b) by 0 days.

(21) Appl. No.: 08/277,937

(22) Filed: Jul. 20, 1994

Related U.S. Application Data

(63) Continuation of application No. 08/075,005, filed on Jun. 10, 1993, now abandoned, which is a continuation of application No. 07/804,615, filed on Dec. 2, 1991, now abandoned, which is a continuation of application No. 07/494,826, filed on Feb. 15, 1990, now abandoned, which is a continuation of application No. 07/274,142, filed as application No. PCT/EP87/00116 on Feb. 26, 1997, now abandoned.

(30) Foreign Application Priority Data

Mar. 29, 1996 (DE) .......................................... 36 10 765

(51) Int. Cl.⁷ ................................................ B05D 1/36
(52) U.S. Cl. .................... 427/407.1; 427/409; 427/412; 524/377; 524/376
(58) Field of Search .............................. 427/407.1, 412, 427/409; 524/377, 376

(56) References Cited

U.S. PATENT DOCUMENTS

| | | | | |
|---|---|---|---|---|
| 3,437,616 A | * | 4/1969 | Nentwig et al. ............. | 525/414 |
| 3,639,147 A | * | 2/1972 | Benefiel et al. ............. | 427/401 |
| 4,150,007 A | | 4/1979 | McCollum | |
| 4,220,679 A | * | 9/1980 | Backhouse ............... | 427/407.2 |
| 4,333,845 A | * | 6/1982 | Garner ........................ | 252/170 |
| 4,694,051 A | * | 9/1987 | Kordomenos et al. ...... | 525/454 |

FOREIGN PATENT DOCUMENTS

| | | |
|---|---|---|
| BE | 662798 | 4/1965 |
| EP | 0138614 | 10/1984 |
| FR | 2487841 | 8/1980 |
| NL | 7602590 | 3/1976 |

OTHER PUBLICATIONS

*Advances in Chemistry,* Nakajima," Fraction of Linear Polyethylene with Gel Permeation Chromatography" America Chemical Society, Wash., D.C. (1973).*

* cited by examiner

Primary Examiner—David W. Wu
(74) Attorney, Agent, or Firm—Kenyon & Kenyon

(57) ABSTRACT

The invention relates to a process for increasing the proportion of components which are non-volatile under processing conditions, in basecoat compositions containing predominantly organic diluents or solvents, for the production of multicoat finishes, preferably metallic finishes. In the process according to the invention, up to 10% by weight of the components which are volatile under processing conditions, are replaced by an aliphatic polyether or by mixtures of aliphatic polyethers, the aliphatic polyethers having a mean molecular weight of not less than 300, containing not less than one hydroxyl group per molecule and being liquid under normal conditions.

8 Claims, No Drawings

PROCESS FOR USING NON-VOLATILE COMPONENTS UNDER PROCESSING CONDITIONS FOR BASECOAT COMPOSITIONS CONTAINING PREDOMINANTLY ORGANIC SOLVENTS

This application is a Continuation of Ser. No. 08/075,005, filed Jun. 10, 1993, now abandoned; which is a Continuation of Ser. No. 07/804,615, filed Dec. 2, 1991, now abandoned; which is a Continuation of Ser. No. 07/494,826, filed Feb. 15, 1990, now abandoned; which is a Continuation of Ser. No. 07/274,142, filed Sep. 29, 1988, now abandoned which is a 371 of PCT/EP87/00116, filed Feb. 26, 1997.

The invention relates to a process for increasing the proportion of components which are non-volatile under processing conditions, in basecoat compositions containing predominantly organic diluents or solvents, for the production of multicoat finishes, preferably metallic finishes.

In the area of automotive finishing in particular, but also in other areas, considerable interest centers on basecoat compositions for the production of multicoat finishes.

Multicoat finishes of the basecoat-clearcoat type have gained wide acceptance in automotive finishing, in particular for metallic finishes.

Basecoat-clearcoat finishes are produced in such a way that a pigmented basecoat is applied first, and after a short flash-off period without baking (the wet-on-wet process), a clearcoat is applied over the basecoat and subsequently the basecoat and clearcoat are baked together.

The paints for the production of these basecoats must be capable of being processed by the today's customary economical wet-on-wet process, ie. they must be capable of being coated by a (transparent) topcoat after a predrying period as short as possible without baking, without manifesting interfering dissolution and strike-in phenomena.

In addition, still further problems must be solved in the development of paints for metallic finish basecoats. The metallic effect depends crucially on the orientation of the metallic pigment particles in the paint film. A metallic finish basecoat suitable for the wet-on-wet process must therefore produce paint films in which the metallic pigments are present, after application, in a favorable spatial orientation and in which this orientation is rapidly fixed in such a way that it cannot be disturbed in the course of the coating process.

A whole range of basecoat compositions containing predominantly organic diluents or solvents for the production of multicoat finishes, in particular metallic finishes, is known which is suitable for producing multicoat finishes with excellent properties.

However, these basecoat compositions belonging to the state of the art have the disadvantage of containing a relatively low proportion of components which are non-volatile under the processing conditions.

It is a declared aim of paint manufacturers to reduce the proportion of components which are volatile under processing conditions in basecoat compositions containing predominantly organic diluents or solvents, for the production of multicoat finishes, preferably metallic finishes.

There has been no shortage of experiments aiming at increasing the proportion of non-volatile components at the expense of the volatile components.

Thus attempts have been made, for example, to reduce the mean molecular weight of the binders contained in the basecoat compositions and/or to add microgels and/or solid fillers to the basecoat compositions.

All these measures, however, have disadvantages.

If, for example, the mean molecular weight of the binder components in established, optimally balanced basecoat compositions containing metallic pigments is reduced, it is true that a part of the organic diluents or solvents which are volatile under processing conditions can be dispensed with, but against that one must put up with a poorer metallic effect, redissolution problems, deterioration of color retention and loss of reliability in application.

The addition of microgels usually affects the rheological properties of the paint systems; in addition, compatibility problems can occur.

Microgels cannot be added to established, optimally balanced basecoat compositions, in particular basecoat compositions containing metallic pigments, without creating further problems. They require an expensive adaptation of the total paint system to the amounts and type of the microgels to be added.

The addition of solid fillers to the basecoat compositions, in particular to basecoat compositions containing metallic pigments, has a negative effect on the appearance of the resultant finishes and usually does not permit any reduction of the absolute amount of components which are volatile under processing conditions, contained in the basecoat compositions.

The present invention is based on the object of providing a process for increasing the proportion of the components which are non-volatile under processing conditions, in basecoat compositions containing predominantly organic diluents or solvents, for the production of multicoat finishes, preferably metallic finishes.

The process should be applicable to as many established, optimally balanced basecoat compositions as possible, in particular to basecoat compositions containing metallic pigments, without any large technical outlay, and it should not affect negatively the quality (for example redissolution behavior, color retention, reliability in application and achievable metallic effect) of the established, optimally balanced basecoat compositions.

Surprisingly, these objects can be achieved by replacing up to 10% by weight of the components which are volatile under processing conditions, by an aliphatic polyether or by mixtures of aliphatic polyethers, the aliphatic polyethers having a mean molecular weight of not less than 300, containing not less than one, preferably ably not less than two, hydroxyl groups per molecule and being liquid under normal conditions.

The invention also relates to the use of aliphatic polyethers which are liquid under normal conditions or of mixtures of aliphatic polyethers, preferably polypropylene oxides, having a mean molecular weight of not less than 300 and containing not less than one, preferably not less than two, hydroxyl groups per molecule, for increasing the proportion of components which are non-volatile under processing conditions, in basecoat compositions containing predominantly organic diluents or solvents, for the production of multicoat finishes, preferably metallic finishes.

The process according to the invention can be employed for all basecoat compositions containing predominantly organic diluents or solvents and containing or not containing microgels, for the production of multicoat finishes, and is suitable for basecoat compositions containing or not containing metallic pigments.

The process according to the invention is preferably used for basecoat compositions containing predominantly organic diluents or solvents, which are suitable for the production of metallic finishes of the basecoat-clearcoat type. Many such basecoat compositions are described in the literature. There are for example the patents U.S. Pat. Nos. 3,639,147, 4,576,868, 4,220,679 and U.S. Pat. No. 4,477,536. Paints containing metallic pigments and based on cellulose acetobutyrate/polyester, cellulose acetobutyrate/acrylate resin, polyurethane/ polyester, microgel/acrylate resin or microgel/polyurethane/polyester binder systems are particularly preferred.

The basecoat compositions under discussion are basecoat compositions which contain non-aqueous organic diluents or solvents. These basecoat compositions are supplied to the paint finisher with a defined on-delivery viscosity which is higher than that required for the application. There the paint is processed in such a way that
(1) it is brought to the viscosity required for the application by the addition of organic solvents or diluents,
(2) it is applied to the substrate by means of generally known application methods (in particular by pneumatic application or by electrostatic high-speed rotary atomization),
(3) it is overcoated with a clearcoat after a flash-off period generally lasting 30 to 500 seconds, and finally
(4) it is baked in general from about 120 to 140° C. for 20 minutes.

The term "components non-volatile under processing conditions" is in this context understood to mean paint components which do not lose more than 5% of their weight by volatilization, ie. by evaporation, under conditions prevailing in the processing stages (1) to (4).

The term "aliphatic polyethers" is understood to mean substances containing several structural units of the general formula —(R—O)—, in which R represents an alkylene radical of 2 to 6 carbon atoms.

The aliphatic polyethers which can be used according to the invention, must possess a mean molecular weight of not less than 300. Furthermore, they must contain not less than one, preferably not less than two, hydroxyl groups per molecule and they must be liquid under normal conditions (20° C., 760 Torr).

Provided that these limitations are observed, any aliphatic polyether which is soluble or dispersible in the organic solvents or diluents can be used for increasing the proportion of components which are non-volatile under processing conditions. Examples of such aliphatic polyethers are polyalkylene oxide polyols, such as for example polyethylene oxide polyols, polypropylene oxide polyols as well as ethoxylation and/or propoxylation products of suitable di- to hexavalent starter molecules, such as for example glycerol, trimethylolpropane, hexanetriol, pentaery-thritol, sorbitol, sucrose, ammonia, ethylenediamine, aniline etc. Mixtures of aliphatic polyethers can also be used. Polypropylene oxide polyols are preferably used.

The addition of the aliphatic polyethers according to the invention is limited by two factors: on the one hand the aliphatic polyethers according to the invention behave in the coatings produced from the basecoat compositions as plasticizers, and on the other hand the aliphatic polyethers according to the invention increase the hydrophilicity of the coatings produced from the basecoat compositions. The extent of the two effects depends as much on the composition of the basecoat compositions as on the nature of the aliphatic polyethers used. The average person skilled in the art can rapidly determine by simple means in what amount a particular aliphatic polyether can be incorporated in a basecoat composition without the coatings produced from it being too soft or too hydrophilic.

Surprisingly, up to 10% by weight of the components which are volatile under processing conditions can be replaced in established, optimally balanced basecoat compositions preferably containing metallic pigments, by the aliphatic polyethers according to the invention without negatively affecting redissolution behavior, color retention, reliability in application or metallic effect of the coatings produced from the basecoat compositions.

The aliphatic polyethers according to the invention probably act as reactive diluents or solvents. They do not have a negative effect on the good properties of optimally balanced basecoat compositions, they are non-volatile under processing conditions and probably react in the baking process via their hydroxyl groups with suitable binder components, for example melamine-formaldehyde resins.

Surprisingly, it has been further found that the addition according to the invention of the aliphatic polyethers according to the invention also improves the spray mist pick-up and facilitates the electrostatic application.

By the process according to the invention a process has been made available which permits to increase, by very simple means, the proportion of components which are non-volatile under processing conditions, in the basecoat compositions under discussion or to adjust it to a given value.

The invention is explained in, further detail in the examples below. All parts and percentages are by weight, unless expressly stated otherwise.

EXAMPLE A 1

741 g of a polyester prepared from adipic acid and neopentyl glycol with a hydroxyl value of 113 and 26.5 g of diethylene glycol are weighed into a four-necked flask provided with a stirrer, thermometer and reflux condenser, and heated to 100° C. The flask is then connected to a vacuum for half an hour in order to remove any moisture present. 1,850 g of butyl acetate, 393 g of 4,4'-dicyclohexylmethane diisocyanate and 0.3 g of dibutyl tin dilaurate are added at 5 minute intervals and the temperature is kept at 100° C. for 1.5 hours. The NCO content is then determined. It is 1.36%.

A dilution vessel is initially charged with a mixture of 1,840 g of butyl acetate, 1,230 g of n-butanol and 70 g of hexamethylenediamine. The intermediate containing the NCO groups is added in the course of 15–20 minutes with stirring. An almost colorless viscous solution is obtained with a solids content of 20%.

EXAMPLE A 2

1,300 g of a caprolactone polyester with a hydroxyl value of 112 are dehydrated with 73 g of neopentyl glycol in vacuo as in Example A 1. After the addition of 1,850 g of butyl acetate, 688 g of 3-isocyanatomethyl-3,5,5-trimethylcyclohexyl isocyanate are added first. After about 5 minutes 0.3 g of dibutyl tin dilaurate are added. After a reaction time of 2 hours at 100° C., the NCO content of the solution is 2.27%.

A dilution vessel is initially charged with a mixture of 1,490 g of butyl acetate, 1,671 g of n-butanol and 88 g of 1,3-diaminopropane. The intermediate containing the NCO groups is added in the course of 15–20 minutes with stirring. An almost colorless viscous solution is obtained with a solids content of 30%.

EXAMPLE A 3

1,500 g of a polyester prepared from 1,6-hexane-diol, neopentyl glycol and adipic acid with a hydroxyl value of 75 are dehydrated in vacuo as in Example A 1. After the addition of 2,200 g of butyl acetate, 393 g of 4,4'-dicyclohexylmethane diisocyanate are first added, followed by the addition, after about 5 minutes, of 0.3 g of dibutyl tin dilaurate. After a reaction time of 2 hours at 100° C. the NCO content of the solution is 0.98%.

A dilution vessel is initially charged with a mixture of 2,280 g of butyl acetate, 1,490 g of butanol and 98 g of 1-amino-3-aminomethylcyclohexane. The intermediate containing the NCO groups is added in the course of 15–20 minutes with stirring. A faintly yellowish viscose solution with a solids content of 25% is obtained.

EXAMPLE B 1

111.3 g of 1,3-propanediol, 329.9 g of 2,2-dime-thyl-1,3-propanediol, 163.5 g of 1,1,1-trimethylolpropane, 216.7 g of phthalic anhydride, 243.0 g of isophthalic acid, 245.0 g of adipic acid, 30.0 g of xylene and 2 g of dibutyl tin oxide are weighed into a 2 liter four-necked flask provided with a stirrer, electric resistance heating, a thermometer, a column packed with Pall rings, equipped with a head thermometer, a distillation bridge, a condenser and a receiver. The reaction mixture is rapidly heated to 160° C. with stirring. The temperature is raised from 160° C. to 220° C. in the course of 5 hours at such a rate that the temperature at the head of the column does not exceed 103° C. The temperature is maintained at 220° C. and esterification is continued until an acid number (according to DIN) of 15 is reached. The reaction mixture is then cooled to 140° C., and the polyester is dissolved in 800 g of a 1:1 mixture of xylene and ethylglycol acetate with further cooling. A 60% solution, based on the solid polyester, of a polyester of a molecular weight of 930 and a hydroxyl value (DIN) of 160 is obtained.

EXAMPLE B 2

60.4 g of 1,2-ethanediol, 74.0 g of 1,2-propane-diol, 227.9 g of 2,2-dimethyl-1,3-propanediol, 229.9 g of 1,6-hexanediol, 485.1 g of isophthalic acid, 40.0 g of a mixture of aromatic solvents with a boiling range from 180 to 205° C. and 3.0 g of dibutyl tin oxide are weighed out, using the apparatus described in Example B 1. The mixture is heated in the same manner as in Example 1 and esterified to an acid value of 20. It is then cooled to 160° C., 213.3 g of adipic acid and 93.5 g of trimellitic anhydride are added and the temperature is again brought to 200° C. It is kept at 200° C. and esterification is allowed to proceed to an acid number of 25. The mixture is then cooled and dissolved as in Example B 1. A 60% solution, based on the solid polyester, of a polyester with a molecular weight of 960 and a hydroxyl value of 115 is obtained.

EXAMPLE B 3

Using the apparatus and procedure described in Example B 1, the following are weighed out and esterified at not more than 220° C.: 113.4 g of 1,2-ethanediol, 142.6 g of 2,2-dimethyl-1,3-propanediol, 279.8 g of hydroxypivalic acid neopentyl glycol ester, 91.9 g of 1,1,1-trimethylolpropane, 303.5 g of isophthalic acid, 208.5 g of hexahydrophthalic anhydride, 200.2 g of adipic acid, 30 g of xylene and 2 g of dibutyl tin oxide.

Esterification is carried out at 220° C. to an acid number of 5. A 60% solution, based on the solid polyester, of a polyester with a molecular weight of 1,520 and a hydroxyl value of 100 is obtained.

EXAMPLE B 4

Using the apparatus and procedure described in Example B 1, the following are weighed out and esterified at not more than 220° C.: 102.2 g of 1,2-propanediol, 102.2 g of 1,3-propanediol, 372.8 g of 2,2-dimethyl-1,3-propanediol, 60.0 g of 1,1,1-trimethylolpropane, 331.6 g of phthalic anhydride, 172.0 g of trimellitic anhydride, 196.3 g of adipic acid and 40 g of a mixture of aromatic solvents of a boiling range of 180–205° C.

Heating is carried out as in Example B 1, paying special attention to the temperature at the head of the column, and esterification is allowed to proceed at 200° C. to an acid number of 10. The reaction mixture is cooled and dissolved as described in Example B 1. A 60% solution, based on the solid polyester, of a polyester with a molecular weight of 780 and a hydroxyl value of 198 is obtained.

EXAMPLE C

Melamine Resin

The following are weighed into a 2 liter four-necked flask provided with electrical resistance heating, a stirrer, a thermometer and a distillation apparatus for the continuous removal of water with a water separator: 560 g of isobutanol, 250 g of a 37% aqueous formaldehyde solution, 30 g of toluene and 0.05 g of 85% phosphoric acid. The reaction mixture is heated to 40° C. and 95.3 g of melamine are added. The mixture is heated to 85° C. and the temperature is slowly raised to 100° C., so that the reaction mixture continuously distills, water being separated off. The mixture is kept at 100° C. until one part of it is compatible with 5 parts of a petroleum ether of boiling range 135–180° C. The reflux part of the distillation apparatus is then closed off and 300 g of solvent are distilled off; the temperature thereby rises to 115° C. The temperature is then reduced to 80° C. and the reaction mixture is diluted with 65 g of isobutanol. A solution of a melamine resin with a solids content (60 min 100° C.) of 55% and a viscosity of 250 sec (DIN 53 211) is obtained.

EXAMPLE D
Copolymer Dispersion 200 g of xylene and 100 g of an ethylene/vinyl acetate copolymer with a vinyl acetate content of 12% are weighed into a mixer which can be heated and is provided with a high-speed stirrer, the mixture is heated to 100° C. and stirred until a homogeneous solution is obtained. The temperature is then reduced to 80° C. and the solution is precipitated with 700 g of a mixture of xylene and butyl acetate, the temperature thereby dropping to 50° C. A 10% dispersion of the copolymer is obtained.

EXAMPLE E 1
Preparation of a Microgel Concentrate 2,510 g of demineralized water are heated to 80° C. with 34 g of 35% sodium lauryl sulfate solution in a polymerization vessel provided with a stirrer, reflux condenser and two inlet vessels.

A pre-emulsion, consisting of 1,267 g of demineralized water, 65 g of 35% sodium lauryl sulfate solution, 490 g of butanediol diacrylate, 478 g of methyl methacrylate and 140 g of hydroxypropyl methacrylate is prepared, with stirring, in a seperate vessel provided with a stirrer.

One of the inlet vessels is charged with the initiator solution, consisting of 14 g of ammonium per-sulfate and 660 g of demineralized water. The pre-emulsion and the initiator solution are then metered in simultaneously at such a rate that the addition of the pre-emulsion takes 2 hours and that of the initiator solution 3 hours. The temperature is kept at 80° C. by cooling. At the end of the addition, the temperature is kept at 80° C. for a further 1 hour.

A 20% dispersion of crosslinked particles insoluable in any organic solvent, is obtained.

2,000 g of this aqueous dispersion are vigorously shaken in a separating funnel with 620 g of n-butanol for 10 minutes. After a waiting period of 30 minutes, 2 phases are obtained. The lower aqueous phase is discarded.

The butanol phase containing the microgel is transferred into a distillation flask equipped with a water separator and a stirrer. 333 g of the polyester described in Example B 2 and 500 g of ethylglycol acetate are added. The remaining water is then distilled off azeotropically in vacuo at a temperature not higher than 60° C. A microgel concentrate with a solids content of 32% is obtained.

EXAMPLE E 2

2,000 g of the aqueous dispersion described in Example E 1 are vigorously shaken in a separating funnel with 800 g of butyl acetate for 15 minutes. After a waiting period of 1.5 hours, 2 phases are obtained. The aqueous phase is discarded. The organic phase is transferred into a distillation flask equipped with a water separator and a stirrer. 400 g of a polyester prepared from adipic acid and neopentyl glycol with a hydroxyl value of 123 are added. Any water still present is then distilled azeotropically in vacuo at a temperature not higher than 60° C. A microgel concentrate with a solids content of 60% is obtained. 280 g of 4,4'-dicyclohexyl-methane diisocyanate and 0.3 g of dibutyl tin dilaurate are added to 1,500 g of this concentrate as in Example A 1. After a 2 hours' reaction, the NCO content is 2.66%.

A dilution vessel is charged with a mixture of 1,090 g of butyl acetate, 218 g of n-butanol and 95 g of 1-amino-3-aminomethylcyclohexane. The intermediate containing the NCO groups and the microgel is added with stirring in the course of 15–20 minutes. A turbid paste-like mass with a bluish glitter with a solids content of 40% is obtained.

Examples Basecoats 1 to 10

The polyurethane/polyurea elastomer solutions described in Examples A 1 to A 3 are mixed, with stirring, with the polyester solutions described in Examples B 1 to B 4, the melamine-formaldehyde resin described in Example C and, if appropriate, the copolymer dispersion described in Example D and/or the microgel dispersion described in Examples E 1 and E 2 in a vessel provided with a stirrer in such a manner that a homogeneous mixture is produced having the composition, based on 100 parts by weight of the solid, corresponding to the data in Table 1. Subsequently an amount of a non-leafing aluminum bronze indicated in the Table, in the form of a 65% paste with aliphatic hydrocarbons, is cautiously mixed to a dough with 1.5 times the amount of butyl acetate, based on the solid aluminum bronze, added to the previously described mixtures of polyurethane/polyurea elastomer solutions, polyester, melamine-formaldehyde resin solutions and, if appropriate, copolymer dispersion or microgel, and dispersed. The resultant mixtures are adjusted to a solids content of 25% by weight using a mixture of 50 parts by weight of butyl acetate, 25 parts by weight of butylglycol acetate and 25 parts by weight of butanol. Subsequently 6 to 7 parts by weight (based on the total paint system) of polypropylene oxide diol which is liquid under normal conditions and has a mean molecular weight of about 900, are added to the basecoats formulated in this manner.

TABLE 1

Basecoats (solids content of the solutions in parts by weight, based on total solids content = 100)

|     | 1  | 2  | 3  | 4  | 5  | 6  | 7  | 8  | 9  | 10 |
|-----|----|----|----|----|----|----|----|----|----|----|
| A 1 | 30 | —  | —  | —  | —  | 21 | —  | —  | 48 | 25 |
| A 2 | —  | 60 | —  | 60 | —  | —  | 40 | —  | —  | —  |
| A 3 | —  | —  | 45 | —  | 40 | —  | —  | 35 | —  | —  |
| B 1 | 40 | —  | —  | —  | —  | 50 | 21 | —  | —  | —  |
| B 2 | —  | 10 | —  | 5  | —  | —  | —  | —  | —  | —  |
| B 3 | —  | —  | 25 | —  | 21 | —  | —  | —  | —  | 45 |
| B 4 | —  | —  | —  | —  | —  | —  | —  | 37 | 38 | —  |
| C   | 12 | 12 | 12 | 12 | 12 | 17 | 12 | 16 | 15 | 18 |
| D   | 6  | 6  | 6  | —  | —  | —  | —  | —  | —  | —  |
| E 1 | —  | —  | —  | 10 | —  | —  | 15 | —  | —  | —  |
| E 2 | —  | —  | —  | —  | 15 | —  | —  | —  | —  | —  |
| Aluminum | 12 | 12 | 12 | 12 | 12 | 12 | 12 | 12 | 12 | 12 |

EXAMPLE K 1
Clearcoat-acrylate 941 g of a mixture of aromatic solvents with a boiling range of 156–170° C. are weighed into a 3 liter reaction vessel provided with a thermometer, a stirrer, electric resistance heating, a reflux condenser and an inlet vessel, and heated to 140° C. with stirring. A mixture of 223 g of styrene, 223 g of methyl methacrylate, 208 g of 1,4-butanediol monoacrylate, 30 g of acrylic acid, 803 g of n-butyl acrylate and 18 g of di-tert-butyl peroxide is added to the reaction vessel from the inlet vessel in a regular stream in the course of 3 hours and the temperature is kept at 140°

C. The reaction mixture is kept at 140° C. for a further 30 minutes and then a solution of 4 g of di-tert-butyl peroxide in 50 g of the mixture of aromatic solvents with a boiling range between 156 and 172° C. is added.

After a further 2 hours at 140° C., an acrylate resin solution with a solidscontent of 60% is obtained. The acrylate resin has an acid number of 14, a hydroxyl number of 109 and a viscosity of 250 mPa.s (determined as a 50% solution in xylene using the ICI viscometer).

EXAMPLE K 2

Clearcoat 300 g of the solution of the melamine-formaldehyde resin described in Example C, 150 g of xylene and 50 g of butylglycol acetate are added with stirring to 550 g of the 60% acrylate resin solution described in Example K 1 and cautiously mixed. A clearcoat with a solids content of 46.5% is obtained.

Production of the Coatings

To produce the coatings, sections of body panels used in automotive mass production finishing which have been passivated by iron phosphating and have received a coating of paint by cathodic electrodeposition and a baking filler, are coated with the basecoats described in Examples 1 to 10 and the clearcoat described in Example K 2.

For this purpose, the viscosity of the basecoats described in Examples 1 to 10 is adjusted to a value of 16 sec according to DIN 53 211 using a solvent mixture of xylene and butyl acetate (70:30), and that of the clearcoat described in Example K 2 to a viscosity of 28 sec according to DIN 53 211 using this solvent mixture.

The pre-treated body panel sections, described above, are spray-coated with the adjusted basecoats using a flow-cup spray gun with a nozzle 1.2 mm wide and a spray pressure of 4 bar in such a manner that a basecoat dry film thickness of 12 to 17 $\mu$m is obtained. The sprayed-on basecoat is spray-coated after 5 minutes with the adjusted clearcoat, using the spraying conditions indicated above, in such a manner that a clearcoat dry film thickness of 35 to 40 $\mu$m is obtained. After a 15 minutes' flash-off period at room temperature the panels are baked in a circulating air oven at 130° C. for 30 minutes.

The coatings prepared in this manner exhibit a metallic effect considered to be outstanding by an expert, they meet the requirements of the tests listed in the technical delivery conditions of automotive mass production finishing and they are indistinguishable from coatings prepared from polyether-free systems under the same conditions.

Systems which are free from polyethers require for the adjustment of spray viscosity a greater amount of diluting solvent mixture than the systems according to the invention containing polyethers.

What is claimed is:

1. A method of coating a substrate comprising:
    adding an organic solvent and a non-volatile aliphatic polyether to a higher-viscosity basecoat composition so as to produce a lower-viscosity basecoat composition, said higher-viscosity basecoat composition being suitable for producing a polyether-free, lower-viscosity basecoat composition and said non-volatile aliphatic polyether containing at least one hydroxyl group per molecule, having a mean molecular weight not less than about 300 and being present in an amount from about 6 to about 10 weight percent of the total weight of the volatile and non-volatile components;
    applying the polyether-containing, lower-viscosity basecoat composition to a substrate;
    allowing a flash-off period to occur without baking;
    overcoating the coated substrate with a clearcoat; and
    baking the overcoated substrate to produce a multicoat finish such that said finish has a metallic appearance equal to that of a metallic finish prepared from the polyether-free, lower-viscosity basecoat composition.

2. The method according to claim 1 wherein said non-volatile aliphatic polyether comprises a polypropylene oxide polyol having a mean molecular weight between 300 and 900.

3. The method according to claim 2 wherein said polypropylene oxide polyol has a mean molecular weight of approximately 900.

4. The method according to claim 1 wherein said multicoat finish is a metallic multicoat finish.

5. The method according to claim 1 wherein said non-volatile aliphatic polyether has not less than two hydroxyl groups per molecule.

6. The method according to claim 1 wherein said non-volatile aliphatic polyether is liquid at 20° C.

7. The method according to claim 1 wherein said non-volatile aliphatic polyether comprises a mixture of non-volatile aliphatic polyethers.

8. The method according to claim 1 wherein said non-volatile aliphatic polyether does not alter redissolution behavior, color retention, reliability in application or metallic effect of said multicoat finish as compared to the substantially polyether-free, lower-viscosity basecoat composition.

* * * * *